United States Patent [19]

Rolnick

[11] 4,111,591
[45] Sep. 5, 1978

[54] COMBINATION TAP AND DIE WRENCH

[75] Inventor: Edward M. Rolnick, North Dartmouth, Mass.

[73] Assignee: Gulf & Western Manufacturing Company, Southfield, Mich.

[21] Appl. No.: 826,439

[22] Filed: Aug. 22, 1977

[51] Int. Cl.² ............................ B23G 5/08; B23G 5/10; B23G 5/14

[52] U.S. Cl. .................................... 408/117; 408/221; 408/222; 408/239 R; 10/123 R; 81/177 R; 81/177 D

[58] Field of Search .................. 408/239 R, 240, 238, 408/241, 215, 221, 117, 222; 81/177 R, 177 D, 177 M, 177 ST, 177 G; 10/123 R, 123 P, 123 S

[56] References Cited

U.S. PATENT DOCUMENTS

| 176,694 | 4/1876 | Saunders | 408/117 |
|---|---|---|---|
| 372,664 | 11/1887 | Galloway | 408/117 |
| 603,930 | 5/1898 | Sweitzer | 408/117 |
| 938,973 | 11/1909 | Chapman | 408/117 X |
| 1,051,413 | 1/1913 | Johnson | 408/239 |
| 1,126,678 | 2/1915 | Apfeld | 81/177 D |
| 1,148,406 | 7/1915 | Reid | 408/117 |
| 1,771,811 | 7/1930 | Nelson | 408/117 |
| 2,979,742 | 4/1961 | Cowley | 408/240 |
| 3,004,270 | 10/1961 | Cowley | 408/117 |
| 3,715,168 | 2/1973 | Kuhn | 408/239 |

*Primary Examiner*—Horace M. Culver
*Attorney, Agent, or Firm*—Gregory J. Battersby; Charles I. Sherman; Thomas E. Harrison

[57] ABSTRACT

A combination tap and die wrench is provided having a center portion with an aperture extending through the thickness thereof for receiving and retaining tapping apparatus and at least two oppositely extending arm portions extending outwardly from the center portion, each of said arm portions including a plurality of receptacles for receiving and retaining dies. An extension handle is also provided and may be secured to either of the arm portions at their outwardly extending ends. Storage means for tapping apparatus may be provided in the handle.

5 Claims, 7 Drawing Figures

COMBINATION TAP AND DIE WRENCH

BACKGROUND OF THE INVENTION

The present invention relates generally to a combination tap and die wrench and, more particularly, to a tap and die wrench adapted to interchangeably receive and retain a plurality of dies of the same or different dimension and at least one tapping device. An extension handle to be used at one end of the wrench is provided to permit the user of the wrench to be able to generate additional leverage in operation.

Heretofore, it was necessary to use separate tap wrenches and die wrenches depending on the desired operation. Moreover, since not all taps or dies are of the same dimension, many times it was necessary for a mechanic to stock many tap wrenches and die wrenches to accommodate the many different dimensions. To minimize the problem of having to stock numerous wrenches of different types and dimensions, some manufacturers have provided a universal tap and die wrench to which could be interchangeably fitted taps and dies of different configurations by merely interchanging an individual tap with a die. The disadvantage of such a design, however, is that it required actual interchange of the individual tap with the dies thus resulting in a storage problem as well as creating physical manipulation problems.

Attempts have been made to incorporate multiple receptacles for both taps and dies on a single universal wrench. See, for example, the combination wrenches described in U.S. Pat. No. 1,148,406 which issued to E. G. Reid on July 27, 1915; U.S. Pat. No. 1,771,811 which issued to O. Nelson on July 29, 1930; and U.S. Pat. No. 3,004,270 which issued to W. E. Cowley on Oct. 17, 1961. Additionally, see concurrently filed utility patent application Ser. No. 826,797, now U.S. Pat. No 4,097,182 in the name of the same inventor, also entitled "Combination Tap and Die Wrench." Concurrently filed design application Ser. Nos. 826,611 and 826,428 in the name of the same inventor are also co-pending. None of these wrenches, however, permit the simultaneous mounting of both taps and dies on a single wrench thus necessitating the interchange of a tap with a die or vice versa for use.

Against the foregoing background, it is a primary objective of the present invention to provide a combination tap and die wrench capable of receiving and simultaneously retaining both taps and dies.

It is another object of the invention to provide a combination wrench adapted to receive and simultaneously retain both taps and dies, each of the same or different dimension.

It is an additional object of the invention to provide a combination tap and die wrench adapted to receive and simultaneously retain a plurality of dies of the same or different outside dimensions but of different cutting size and at least one tap.

It is still another object of the invention to provide a combination tap and wrench which offers a high degree of leverage during use.

SUMMARY OF THE INVENTION

To the accomplishments of the foregoing objects and advantages, the present invention briefly comprises a combination tap and die wrench with a center portion having an aperture extending through the thickness thereof for receiving and retaining tapping apparatus and oppositely extending arm portions extending outwardly from the center portion, said arm portions each including a plurality of receptacles for receiving and retaining dies. An extension handle is also provided and may be secured to either of the arm portions at their outwardly extending ends. Storage means for tapping apparatus may be provided in the handle.

BRIEF DESCRIPTION OF THE DRAWINGS

The foregoing and still other objects and advantages of the present invention will be more apparent from the following detailed explanation of the invention in connection with the accompanying drawings wherein.

DETAILED DESCRIPTION OF THE INVENTION

Figure 1:
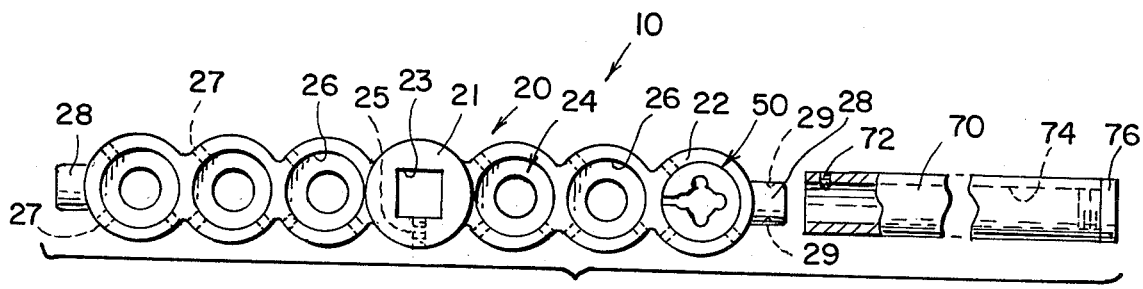
FIG. 1 is a top view of the wrench of the present invention.
Figure 2:
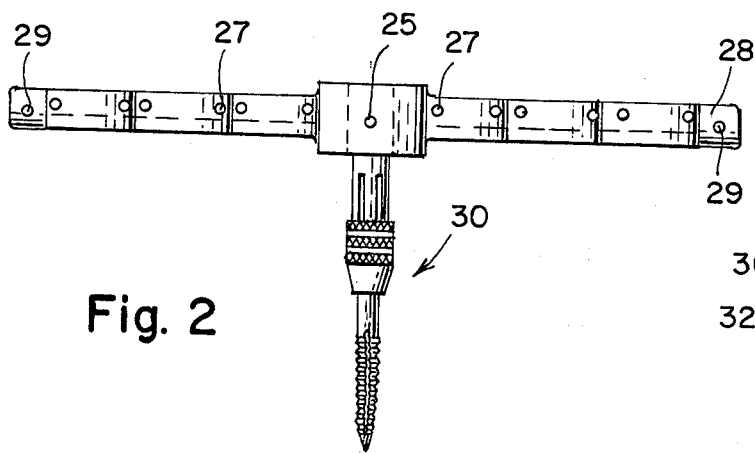
FIG. 2 is a side view thereof with tapping apparatus.
Figure 3:
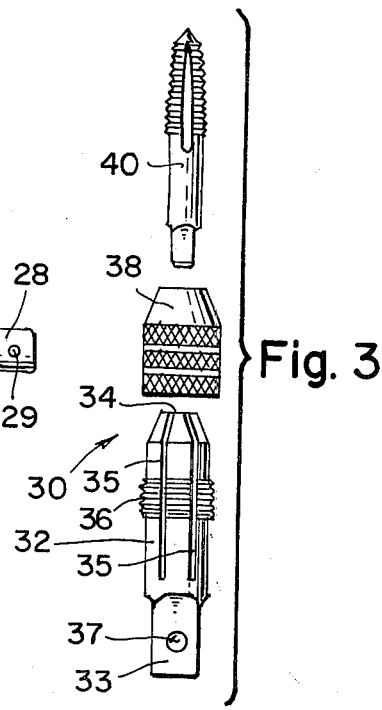
FIG. 3 is a view of the tapping apparatus to be mounted on the wrench of FIGS. 1 and 2.

Referring now to the drawings and, in particular, FIG. 1 thereof, there is provided a combination tap and die wrench which is identified by reference numeral 10. Wrench 10 includes a body member 20 having a center portion 21 and at least two outwardly and oppositely extending arm portions 22. A central aperture 23 is provided through the thickness of the center portion 21 for receiving and positively retaining tapping apparatus 30 as shown in FIG. 2. The arm portions 22 each include a plurality of die receptacles 24, each one adapted to receive and retain an individual die 50. A preferred number of die receptacles 24 on each individual arm portion 22 is three. Arm portions 22 each include at their outwardly extending ends a circular, nubbed end portion 28 for affixation to an extension handle 70 which may be used on either or both arm portions 22 to increase leverage during ultimate use.

The body member 20 may be fabricated from either a metallic or thermoplastic material, preferably a light weight, high strength material such as, for example, aluminum or magnesium.

The central aperture 23 of the center portion 21 is preferably square or rectangular in configuration and extends through tht thickness of the center portion 21 of the wrench 10 so as to offer accessibility for tapping apparatus 30 from both sides of the wrench 10. The aperture 23 is of such shape and dimension as to receive and retain conventional tapping apparatus 30 therein. A spring loaded ball plunger 25 is provided on the external surface of the center portion 21 extending through the center portion 21 into the aperture 23 so as to positively retain the tapping apparatus 30 within the aperture 23. It will be understood that, when desired, the spring loaded ball plunger 25 may be provided on tapping apparatus 30.

The tapping apparatus, referred to generally by reference numeral 30, is of conventional commercial design and includes a tubularly shaped tap chuck 32, a nose piece 38 and a tap 40. Tubularly shaped tap chuck 32 includes a square or rectangular base 33 of such shape and dimension as to be received and positively retained within the aperture 23 of the center portion 21 of wrench 10, and an elongated tubular portion 34 open at the end opposite the base 33. The open end of tubular portion 34 is adapted to receive and retain a tap 40 of pre-determined size and shape. The tubular portion 34 of the chuck 32 is tapered from a point midway between the open end and the base 33 toward its open end and includes at least two and preferably four longitudinally extending slots 35 extending from the base portion to its open end. A threaded portion 36 is further provided on the external surface of the tubular portion 34 for threadably engaging the nose piece 38 in order to retain the tap 40 within the chuck 32. The base 33 includes on at least one of its surfaces, an indented spot 37 for engaging the spring loaded ball plunger 25 of the wrench 10 in order to positively retain the tap chuck 32 within the aperture 23 of the wrench 10. The nose piece 38 is internally threaded and open at both ends. The internally threaded portion of nose piece 38 is adapted to threadably engage the threaded portion 36 on the external surface of the tap chuck 32 in such a manner as to, when a tap 40 is inserted into the open end of tap chuck 32, compress the tubular portion 34 of the chuck 32 at the slots 35 about tap 40 to positively retain the tap 40 within the tap chuck 32. Conventional extension shafts may be used with tapping apparatus 30.

Threading dies 50 are adapted to be received and retained within the die receptacles 24 on the arm portions 22 of the wrench 10. Receptacles 24 are of the same shape and dimension as the dies 50 which they are adapted to receive. A shoulder 26, which is provided within receptacle 24 for supporting the dies 50 has a smaller inside diameter than the inside diameter of the receptacle 24 and the outside diameter of the dies 50. The dies 50 are positively retained within the receptacle 24 by the use of set screws 27. Set screws 27 are preferably V-tipped and a preferred number of set screws 27 per receptacle is three, proximately spaced about the receptacle 24.

Figure 5:
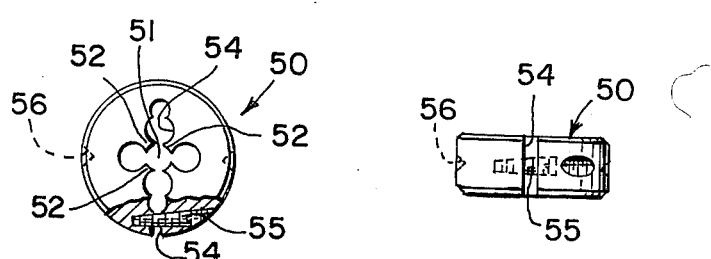
FIG. 5 is a top view of a die for use in conjunction with the wrench of FIGS. 1 and 2.
Figure 6:
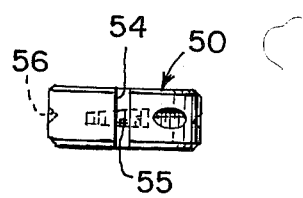
FIG. 6 is a side view of the die of FIG. 5.

As shown in greater detail in FIGS. 5 and 6, the threading dies 50, which are of a conventional commercial design, are circular in shape with threaded cutting surfaces or lands 52 circumfrentially positioned about a centrally positioned internal aperture 51 which extends through the thickness of the dies 50. As shown in particular in FIG. 5, the cutting lands 52 may include three and, in some instances, four or more individual cutting surfaces. The actual cutting dimension of the die 50 is determined by the inside diameter of the circumferential cutting lands 52 which may be adjusted by an adjusting screw 55. It will be appreciated that various dies of different cutting dimensions may all have the same external die diameter thus permitting the wrench 10 to include a plurality of receptacles of the same diameter in which are contained dies of different cutting dimension. Aperture 54, which extends through the thickness of the die 50, allows the cutting dimension of the die 50 to be adjusted using the adjusting screw 55. Notches or depressions 56 are provided on the outside surface of the dies 50 for receiving and engaging the V-shaped tip portions of the set screws 27 of the wrench 10 when the die 50 is positioned within the receptacle 24 so as to secure the die 50 within the receptacle 24 of the wrench 10.

An extension handle 70 or handles are provided and may be used at either or both ends of the wrench 10 by securing it to either or both of the end portions 28 by the use of one or more set screws 72 which are adapted to engage a notch or depression 29 on the end portion 28. Extension handle 70 is employed to permit the user of the wrench to obtain greater leverage when using the wrench 10. The handle 70 may be solid or, as shown in FIG. 1, hollow with an opening 74 at its outwardly extending end. This would allow for the storage of, for example, additional taps 40 or tapping apparatus 30 not in use. An end cap 76, preferably secured by threads or by a pressure fit, is provided to seal the open end 74 as shown in FIG. 1 in order to retain the additional taps within the handle 70.

In actual use, a mechanic may use the wrench in an otherwise conventional manner as either a tap wrench, a die wrench or a combination tap and die wrench as it will accommodate at any one time tapping apparatus, and a plurality of the same or different dimension dies. The dimensional combinations are virtually unlimited and the ability to provide a plurality of dies of different dimension permit a mechanic to somewhat permanently mount all dimension dies he might have an occasion to use. Additionally, the extension handle provides excellent leverage during use.

Figure 7:
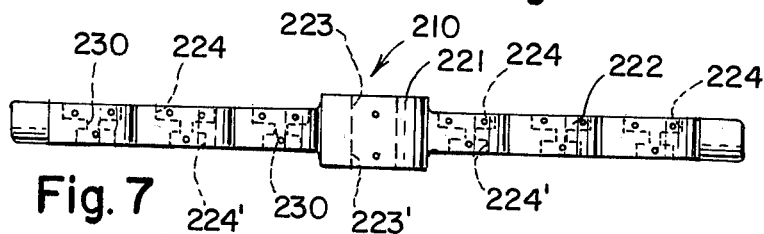
FIG. 7 is a side view of an alternate embodiment of the wrench of the present invention.
Figure 4:
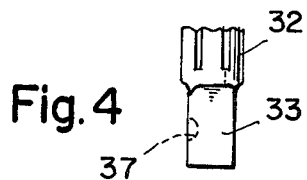
FIG. 4 is a side view of the base portion of the tapping apparatus of FIG. 3.

Another alternative embodiment, shown in FIG. 7, provides a tap and die wrench 210 identical to the wrench 10 of FIGS. 1 and 2 but for a thicker cross-sectional dimension and the inclusion of the same or different diameter die receptacles 224 and 224' on opposite sides of the arm portions 222. A central aperture 223 is provided through the thickness of center portion 221 for receiving tapping apparatus. An aperture 230 is provided extending through the cross-sectional thickness of each receptacle 224. This provides for a greater possible combination of dies than the wrench of FIGS. 1–6 and provides a wrench which can be used alternatively for dies of different outside diameter, such as, for example ¾ inch and 1 inch O.D. dies.

Having thus described the invention with particular reference to the preferred forms thereof, it will be obvious that various changes and modifications may be made therein without departing from the spirit and scope of the invention as defined in the appended claims.

Wherefore, I claim:

1. A combination tap and die stock wrench having a center portion and a pair of oppositely and outwardly extending arm portions from said center portion, said center portion including an aperture extending through the thickness thereof for receiving and positively retaining tapping apparatus and said arm portions each including a plurality of individual die receptacles each adapted to receive and positively retain therein a tapping die, wherein each of said arm portions includes at its outwardly extending end a substantially hollow extension handle for receiving and storing tapping apparatus adapted to be introduced therein through a sealable opening at its outwardly extending end.

2. The wrench of claim 1 wherein at least three die receptacles are provided on each arm portion.

3. The wrench of claim 1 wherein said tapping apparatus is positively retained within the aperture of said center portion by means of at least one spring loaded ball plunger.

4. The wrench of claim 3 wherein each of said dies are positively retained within each die receptacle by means of at least one set screw.

5. A combination tap and die stock wrench having a center portion with an aperture extending through the thickness thereof for receiving and positively retaining tapping apparatus and a pair of substantially flat arm portions having opposed surfaces extending oppositely and outwardly from said center portion, each of said arm portions including a plurality of individual die stock receptacles on both opposed surfaces thereof, the receptacles on one surface adapted to receive and retain dies of a pre-determined outside diameter and the receptacles on the opposite surface of said arm portion adapted to receive dies of a different outside diameter; wherein at least one of said arm portions includes an extension handle secured thereto at its outwardly extending end, said handle being substantially hollow for receiving and storing tapping apparatus adapted to be introduced through a sealable opening at its outwardly extending end.

* * * * *